United States Patent
Beeck et al.

(10) Patent No.: US 6,705,383 B2
(45) Date of Patent: Mar. 16, 2004

(54) PROCESS FOR THE RAPID PRODUCTION OF HOLLOW COMPONENTS OF FLOW MACHINES FOR MANUFACTURING DEVELOPMENT

(75) Inventors: Alexander Beeck, Orlando, FL (US); John Fernihough, Ennetbaden (CH)

(73) Assignee: Alstom Technology Ltd, Baden (CH)

( * ) Notice: Subject to any disclaimer, the term of this patent is extended or adjusted under 35 U.S.C. 154(b) by 28 days.

(21) Appl. No.: 10/002,136

(22) Filed: Dec. 5, 2001

(65) Prior Publication Data

US 2002/0108734 A1 Aug. 15, 2002

(30) Foreign Application Priority Data

Dec. 22, 2000 (DE) .......................... 100 64 267

(51) Int. Cl.[7] .......................... B22D 23/00; B23P 15/04
(52) U.S. Cl. ...................... 164/76.1; 29/889.72; 29/416
(58) Field of Search .............................. 164/76.1, 122.1, 164/122.2; 29/889.7, 889.71, 889.72, 889.721, 416, 463; 416/232, 233

(56) References Cited

U.S. PATENT DOCUMENTS

| | | | |
|---|---|---|---|
| 3,965,963 A | * 6/1976 | Phipps et al. | 164/122.1 |
| 4,364,160 A | * 12/1982 | Eiswerth et al. | 29/889.721 |
| 4,391,684 A | * 7/1983 | Goddard | 205/649 |
| 4,417,381 A | * 11/1983 | Higginbotham | 29/889.721 |
| 4,606,778 A | * 8/1986 | Jahnke | 148/527 |
| 5,152,059 A | * 10/1992 | Midgley | 29/889.7 |
| 5,429,877 A | * 7/1995 | Eylon | 428/586 |
| 5,711,068 A | * 1/1998 | Salt | 29/889.1 |
| 6,162,347 A | * 12/2000 | Fleck | 205/662 |

FOREIGN PATENT DOCUMENTS

| | | | |
|---|---|---|---|
| DE | 24 53 090 B2 | 5/1975 | |
| DE | 31 27 816 C2 | 4/1982 | |
| DE | 32 11 777 A1 | 10/1982 | |
| DE | 33 39 751 A1 | 5/1985 | |
| EP | 0 990 481 A1 | 4/2000 | |
| GB | 1471963 | 4/1977 | |
| GB | 2095589 | 10/1982 | |
| GB | 2 095 589 A | * 10/1982 | ........... B23P/15/04 |

OTHER PUBLICATIONS

"A Decade of Rapid Prototyping", Automotive Engineer, Mechanical Engineering Publ. Ltd., Bury St. Edmunds, GB, Bd. 22, Nr. 4, May 1, 1997, pp. 44–46, 51–52, 55.

* cited by examiner

Primary Examiner—M. Alexandra Elve
Assistant Examiner—Kevin P. Kerns
(74) Attorney, Agent, or Firm—Burns, Doane, Swecker & Mathis, L.L.P.

(57) ABSTRACT

A process for the rapid production of hollow components of flow machines, in particular turbine blades, for manufacturing development. In the process, the turbine blade to be produced is divided into two or more portions such that none of the portions has a cavity. The two or more portions are individually cast by means of a Rapid Prototype process, and are then joined together to form the hollow component. The process makes possible the simple and cost-effective production of turbine blades for manufacturing development, in particular for the development of the cooling systems.

5 Claims, 3 Drawing Sheets

PROCESS FOR THE RAPID PRODUCTION OF HOLLOW COMPONENTS OF FLOW MACHINES FOR MANUFACTURING DEVELOPMENT

FIELD OF THE INVENTION

The present invention relates to a process for the rapid production of hollow components of flow machines, in particular turbine blades, for manufacturing development.

For the production of modern high temperature turbine blades, a time period of several months, up to a year or even more, has to be estimated due to the expensive tool production and the required casting and processing development. Each individual development step requires numerous tests and fine adjustments, which demand considerable time. It is of particular disadvantage here that the following development of manufacturing can only be begun when the design has been largely concluded. Hence necessary changes resulting from manufacturing which affect the previous development steps are possible only at high costs and required time.

BACKGROUND OF THE INVENTION

To shorten the total development time, Rapid Prototype methods can be used, which make possible a nearly parallel performance of casting and processing development and also manufacturing development. With the aid of these Rapid Prototype Methods, cast blanks are produced based on computer model data, and with them both casting development and also the mechanical processing, for example, grinding, milling, etc., and if necessary component tests on a test bench, can be performed, without an associated casting tool having to be in existence.

While this technique offers great advantages for solid cast components, its use for hollow components is only possible under considerable restrictions. Thus for hollow turbine blades, casting cores must be produced first to later occupy the cavities when casting the blades. Suitable Rapid Prototype methods for the production of the ceramic cores however have not yet been elaborated, or require very long production times, as is the case, for example, in carrying out a process in which an aluminum tool is used as the core mold.

According to the intended application, the components in manufacturing development produced with a Rapid Prototype method are therefore either solid blades, or for the production of the cavity, cores of similar, already existing components are used, which have a size comparable to that of the cavity to be produced. However, in the development of eroded or laser-produced cooling air bores, it is required that the wall thicknesses present in the test object produced are correct, so that the development of these cooling air bores can be correctly carried out using rapidly produced components. For development of this kind, neither solid blades nor a pre-existing core of similar size can be used for a Rapid Prototype process.

SUMMARY OF THE INVENTION

The present invention provides a process for the rapid production of hollow components of flow machines which makes possible the use of components made in this manner in manufacturing development or in component tests, particularly with regard to the development of the cooling system of the components.

In the process according to the invention, the hollow components to be produced are divided into two or more portions, such that none of the portions has a cavity. The two or more portions are individually cast by means of a suitable Rapid Prototype process and are then joined together to form the hollow component. The production of the individual portions takes place in a known manner by casting the portions in a corresponding, preferably ceramic, casting shell, so that a precision casting process can be used.

By casting the individual portions and subsequently assembling these portions to form the cavity (or cavities) for finishing the components, there is no longer any necessity for core production in order to produce the cavity or cavities of the components. The joining of the portions together takes place, for example, by adhesion, brazing, welding, or similar joining methods. The portions can also be joined together by means of screws or rivets.

Suitable Rapid Prototype processes for the production of the casting shells are known to the person skilled in the art. Preferably a plastic model of the component is produced by means of stereolithography or other suitable processes, and serves as the inner mold for the production of the ceramic casting shell. This process makes possible the simple, cost-effective, and rapid production of the ceramic casting shell, in which the individual portions are then cast. The whole process is simplified and accelerated by the elimination of the necessity for the production of a casting core.

It was recognized according to the invention that for many areas of manufacturing development, a component, particularly a hollow turbine blade or combustion chamber wall, is sufficient when joined together from several portions. For most development steps or tests, the component does not have to be manufactured from one casting. For example, two halves of the turbine blade can be produced in this manner in a precision casting process and then welded together. Turbine blades are thus produced which admittedly are unsuitable, for strength reasons, for prolonged operation in a machine, but which are nevertheless sufficient for manufacturing development.

Manufacturing steps which require a realistic wall thickness distribution or an internal contour approximating reality, profit from a component produced in this manner. Examples of the use of the component in manufacturing development are thus, in particular, the development of cooling air apertures, for example by laser boring, the performance of through-flow tests or investigations for the application of the internal coating or of the external coating (e.g., corrosion protection layer or TBC).

Manufacturing development can thus be begun before the first prototype components are available from casting development proper. Already in the design phase, production trials can first be carried out in a simple and inexpensive manner, in order to obtain an early feedback of the first production data into the design process.

Furthermore, blades produced in this manner can be tested, both on a test bench and also for a limited time in a prototype machine, in a corresponding design, before the tools are ordered for casting and processing. Thus manufacturing development can already take place at an early point in time, and in particular is independent of the finishing of the expensive casting and core tools. Manufacturing processes can then already be fed in during the design phase (concurrent engineering).

By skillful partition or division of the turbine blade to be produced into the individual portions, the suitability of this rapidly produced component for component tests can be improved. Thus in a particularly advantageous embodiment this division takes place such that, for example with two portions, the first portion is formed as an insert into the second portion, and the second portion provides at least one retaining surface for the first portion, taking up the centrifugal forces acting on the first portion during a rotation of the turbine blade. By means of such an embodiment or division of the portions, the centrifugal forces arising in the test during a circumferential rotation of the turbine blade do not lead to a stressing of the joint connection, so that no high requirements have to be placed on its strength.

BRIEF DESCRIPTION OF THE DRAWINGS

The process according to the invention is explained below with reference to the embodiments shown in the accompanying drawings, without any limitation of the general concept of the invention.

DETAILED DESCRIPTION OF THE PREFERRED EMBODIMENTS

Figure 1A:
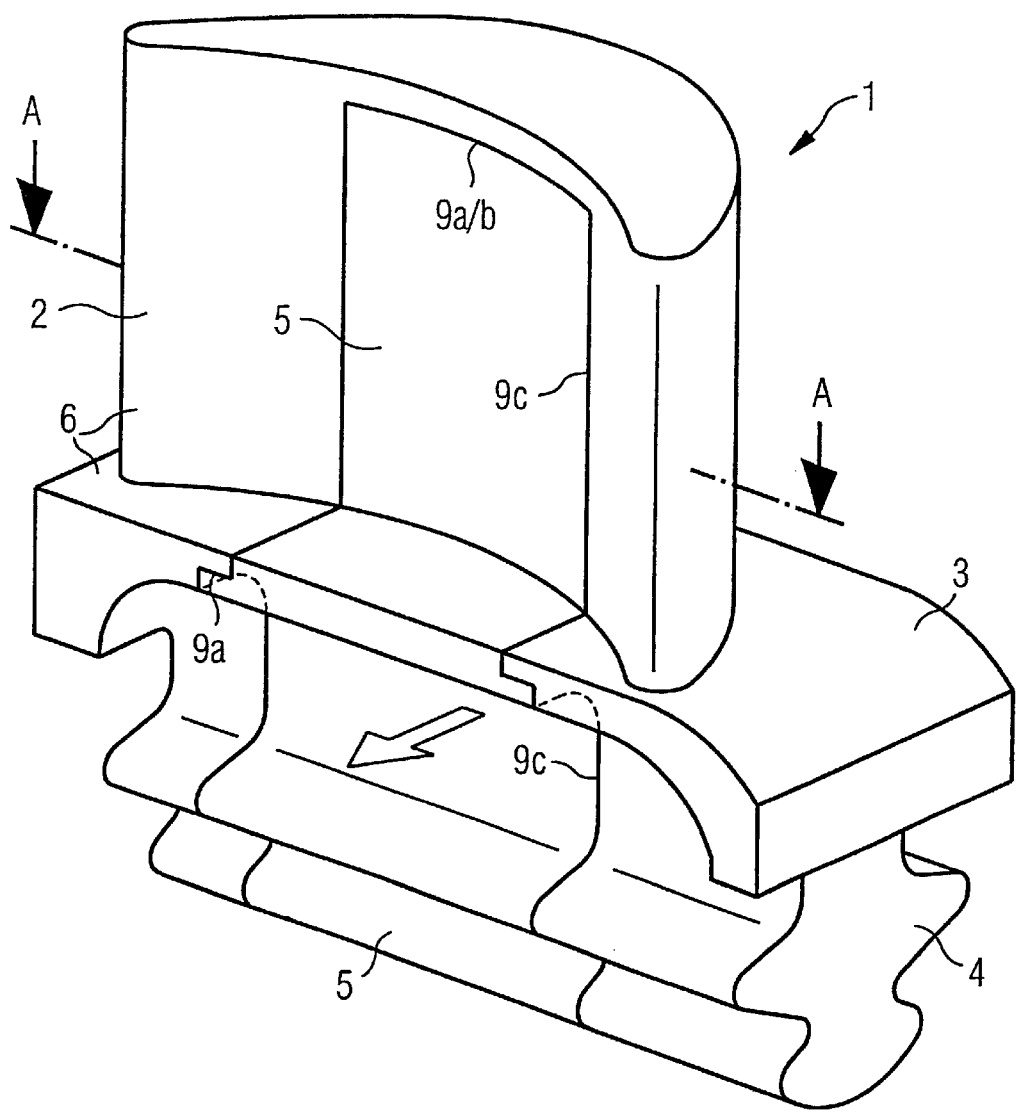
FIGS. 1a–1d show first examples of the division of a turbine blade into individual portions.
Figure 1B:
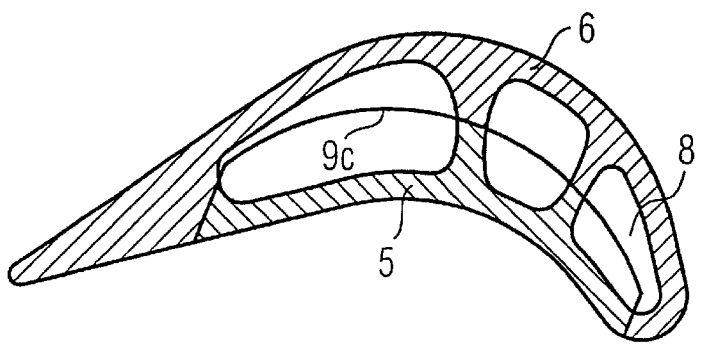
Figure 1C:
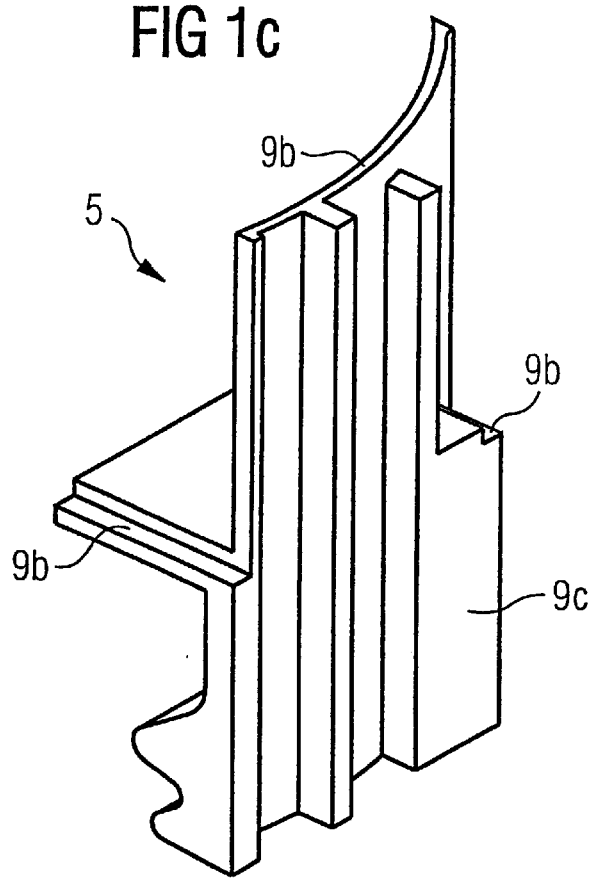

FIGS. 1a–1d show, using four views, a possibility of the division of a turbine blade to be rapidly produced according to the present process. FIG. 1a shows the complete turbine blade 1 with airfoil 2, blade foot 4 and platform 3. A possible partition of this turbine blade into two portions 5 and 6 joined at joint surfaces 9c is indicated in FIG. 1a. The smaller portion 5 forms an insert into the larger portion 6.

Figure 1D:
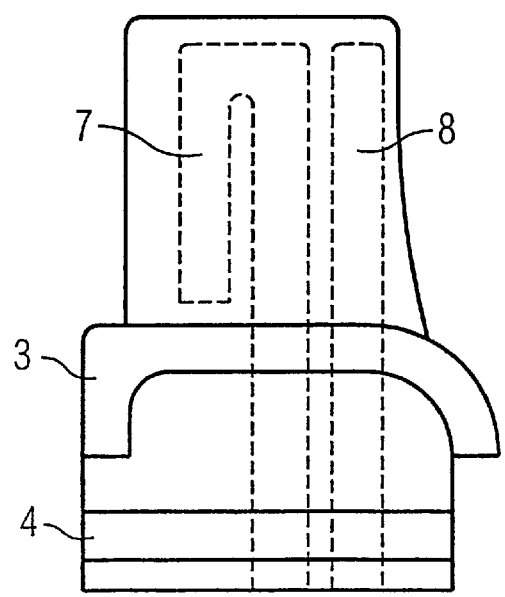

Both portions, when assembled, form a cavity (not visible in FIG. 1a) within the turbine blade 1. The cavity or cavities 7, 8 are to be seen in FIGS. 1b and 1d, in the sectional view along the line AA. The insert 5 is once again shown, in an oblique view, separately in FIG. 1c. FIG. 1d shows a side view of the assembled turbine blade 1, in which the cavities, the rear edge channel 7, and also the nose channel 8 are indicated.

The division of the turbine blade 1 into two portions is effected here such that the larger portion 6 offers retaining surfaces 9a for the inner portion 5, to take up the centrifugal forces which are directed radially outward and which act on the inner portion 5 during a component test of this turbine blade 1.

The two portions 5 and 6 are individually cast by means of a suitable Rapid Prototype process, and are then adhered or welded together. Because of the retaining surfaces 9a which cooperate with corresponding counter-surfaces 9b on the insert 5, no special stress-resistance requirements are set for these joint connections.

Figure 2A:
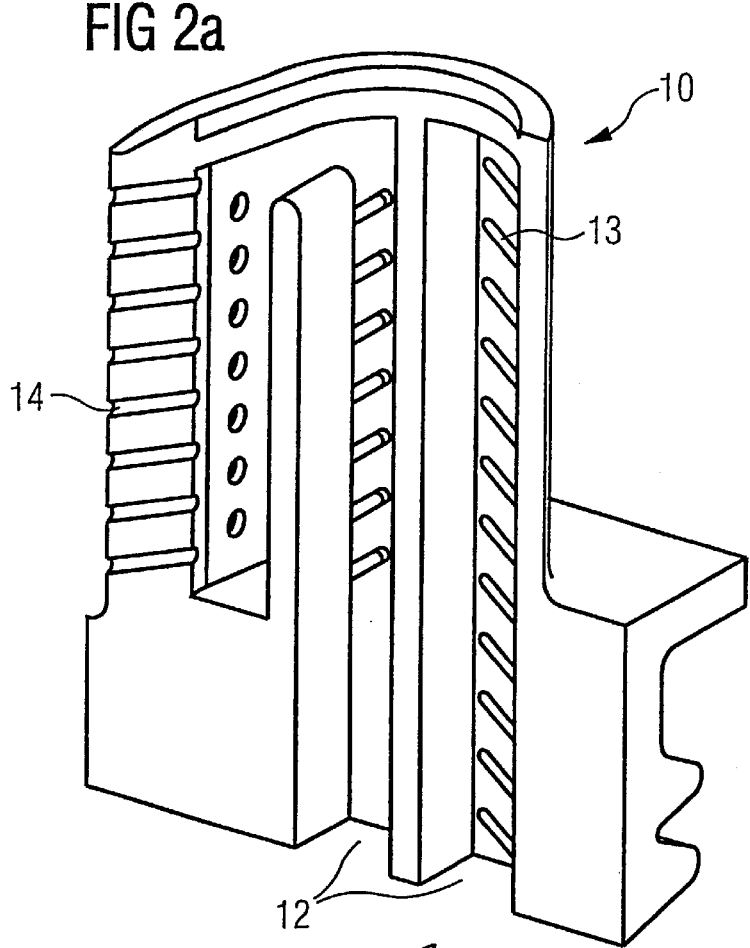
FIGS. 2a and 2b show second examples of the division of a turbine blade into individual portions.
Figure 2B:
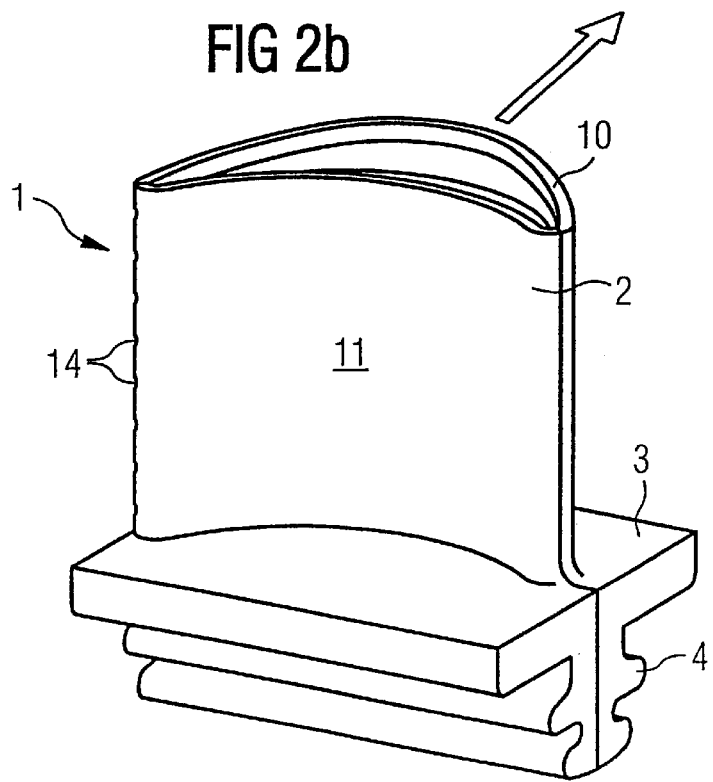

FIGS. 2a and 2b show a further example of a possible division of a turbine blade 1 to be produced into two portions 10 and 11. FIG. 2a shows a first portion 10 with corresponding recesses 12 for the cavity or cavities. Cooling ribs 13 and also cooling air bores 14 can be seen in the recesses, and can be produced in a simple manner when casting this portion. FIG. 2b shows the assembled turbine blade 1 with the corresponding portions 10 and 11. The two portions can again be joined together by means of a suitable joining process, for example, by soldering, welding, or adhesion. Again, both portions are individually cast with a suitable Rapid Prototype process and are then assembled to form the complete blade with the corresponding cavities 12. Due to the simple preparation of cooling ribs and cooling bores by the casting of the individual portions, such a blade can serve especially well for the development and testing of the cooling system.

What is claimed is:

1. A process for the rapid production of a hollow turbine blade comprising:

individually casting two or more portions of the hollow turbine blade by a rapid prototype process, none of the two or more portions having a substantially enclosed cavity; and joining the two or more portions together to form the hollow turbine blade, wherein the hollow turbine blade is divided into portions, such that a first portion is formed as an insert in a second portion, the second portion having at least one retaining projection for retaining the first portion and taking up centrifugal forces acting on the first portion during a circumferential rotation of the hollow turbine blade.

2. The process according to claim 1, wherein the portions are joined together by adhesion, brazing, or welding.

3. The process according to claim 1, wherein the portions are joined together by screws or rivets.

4. The process according to claim 1, 2, or 3, wherein the hollow turbine blade is divided into two portions, each comprising a portion of a blade foot of the turbine blade and a portion of an airfoil.

5. A method of developing hollow turbine blades, said method comprising the steps of:

making a prototype, having at least one of a wall thickness distribution and an inner contour which substantially equals the geometry of an actual production component, applying the method according to claim 1, and performing at least one of testing and development of manufacturing steps using said prototype.

* * * * *